United States Patent [19]

Friedman et al.

[11] Patent Number: 5,040,604
[45] Date of Patent: Aug. 20, 1991

[54] SAND CONSOLIDATION METHOD

[75] Inventors: Rogert H. Friedman; Billy W. Surles, both of Houston, Tex.

[73] Assignee: Texaco Inc., White Plains, N.Y.

[21] Appl. No.: 459,604

[22] Filed: Jan. 2, 1990

[51] Int. Cl.$^5$ .......................................... E21B 33/138
[52] U.S. Cl. .................................... 166/295; 166/300
[58] Field of Search ............... 166/276, 294, 295, 300, 166/305.1; 523/131

[56] References Cited

U.S. PATENT DOCUMENTS

| | | | |
|---|---|---|---|
| 3,123,138 | 3/1964 | Robichaux | 166/295 |
| 3,223,161 | 12/1965 | Burge | 166/295 |
| 3,878,893 | 4/1975 | Copeland | 166/295 X |
| 4,073,342 | 2/1978 | Harnsberger | 166/295 |
| 4,113,015 | 9/1978 | Meijs | 166/295 |
| 4,428,427 | 1/1984 | Friedman | 166/295 X |
| 4,512,407 | 4/1985 | Friedman | 166/300 X |
| 4,787,453 | 11/1988 | Hengill et al. | 166/295 X |
| 4,800,960 | 1/1989 | Friedman et al. | 166/295 X |
| 4,842,072 | 6/1989 | Friedman et al. | 166/300 X |
| 4,895,207 | 1/1990 | Friedman et al. | 166/295 X |
| 4,938,287 | 7/1990 | Friedman et al. | 166/295 X |

*Primary Examiner*—George A. Suchfield
*Attorney, Agent, or Firm*—Jack H. Park; Kenneth R. Priem

[57] ABSTRACT

This invention relates to a method of treating wells completed in subterranean formations containing unconsolidated sand particles, so as to form a permeable barrier which permits relatively free flow of liquids including petroleum therethrough while restraining the flow of sand particles into the wellbore. The method comprises formulating a treating fluid containing a compound which undergoes acid catalyzed polymerization, preferably an oligomer or furfuryl alcohol, and an anhydride of a strong acid such as phosphorous tribromide mixed in a suitable diluent such as methyl isobutyl ketone. The composition is injected into the formation. The anhydride reacts with trace amounts of water forming an acid which catalyzes the polymer. Polymerization produces more water to react with additional anhydride. The water content of the treating zone must be less than five percent by volume based on the volume of the pore volume of the treating zone, which usually requires a pre-treatment to remove water from the treatment zone, such as a preflush with a non aqueous fluid.

17 Claims, No Drawings

SAND CONSOLIDATION METHOD

FIELD OF THE INVENTION

This invention pertains to a method for treating wells penetrating and completed in subterranean earth formations, and more particularly to a method for treating a portion of a petroleum-containing formation which also contains unconsolidated sand, immediately adjacent to the well so as to stabilize the unconsolidated sand and prevent migration thereof into the well. Still more particularly, this invention pertains to a method of treating such wells by introducing a treating fluid containing a polymer which can be acid catalyzed to undergo condensation polymerization, a solvent and an anhydride of a strong acid. The anhydride reacts first with residual water to form an acid which catalyzes the polymerization reaction. The result is the creation of a strong, permeable barrier in the portion of the formation contacted by the fluid by binding the sand grains together.

BACKGROUND OF THE INVENTION

Recovery of formation fluids, especially petroleum from subterranean formations is frequently difficult when the subterranean formation is comprised of one or more incompetent or unconsolidated sand layers or zones. The sand particles in the incompetent or unconsolidated sand zones move or migrate into the wellbore during the recovery of formation fluids from that zone. During the production of petroleum from wells completed in formations containing unconsolidated sand, the movement of sand into the wellbore can cause the well to cease production of fluids therefrom after a relatively short period of time. The small sand particles plug small openings in sand restraining devices placed on the end of the production tubing in the wellbore such as screens or slotted liners. The accumulation of the sand along the small openings cause the production of fluid to be reduced or stopped altogether. Moreover, sand particles often flow through the openings in the screens and are produced to the surface of the earth, where they cause considerable mechanical problems because of their abrasive nature, leading to early failure of pumps and other mechanical devices used in the production of petroleum.

Many techniques have been described in the prior art for preventing or decreasing the flow of sand into the well during the course of petroleum production, including sand screens, filters, perforated or slotted liners, incorporated in the well. These prior art techniques have been successful in limited instances, but are seldom entirely satisfactory for a number of reasons. The mechanical devices usually restrain only the larger sand particles that are not completely effective for the purpose of restraining or preventing the flow of fine particles from the formation into the well and ultimately to the surface. Such devices have a relatively small filter area and so tend to become plugged quickly. Furthermore, these devices are expensive and they interfere with various types of completion and workover operations which are routinely applied to producing oil wells.

Chemical compositions have been described in the literature which can be injected into subterranean formations to bond the sand grains together, using a resinous plastic material which forms a permeable mass within the formation itself immediately surrounding the portion of the formation from which fluid production is being taken. These methods usually involve injecting into the unconsolidated sand around a wellbore, a polymerizable, resinous material which is later caused to polymerize so as to consolidate the formation sand in order to form the desired fluid permeable mass which restrains the flow of sand particles. Numerous difficulties have been encountered in commercial application of these techniques, including the difficulty of achieving even polymerization of the resinous material to the degree necessary to consolidate the sand particles while still maintaining the necessary permeability so the petroleum or other fluids may pass freely from the formation through the consolidated mass into the well. Furthermore, these materials are expensive.

Numerous previous publications including our copending application Ser. 07-357-571 filed May 30, 1989, now U.S. Pat. No. 4,903,770 for Sand Consolidation Process, and U.S. Pat. No. 4,842,072 issued June 27, 1989 for Sand Control Method, describe processes using monomers or oligomers of furfuryl alcohol in combination with an ester and an acid catalyst to form a sand consolidating, polymerized matrix in a formation adjacent to an oil well to restrain the flow of sand. These processes have been used with success in numerous oil fields and found to produce consolidations which are tough and durable and exhibit unique temperature stability. The acid catalyst incorporated in the treating fluid causes reaction times well suited to placing the fluid in the formation and having the polymerization occur at precisely the correct time, so the treating fluid is located where the consolidation is needed, adjacent to the producing well, providing the formation temperature is at least 200.F. At temperatures lower than 200. F, the reaction rate is so low that the treating fluid tends to leak away from the zone where consolidation is desired, resulting in a low quality consolidation result, or even a total failure.

In view of the foregoing discussion, it can be appreciated that there is a substantial, unfulfilled need for a method for consolidating unconsolidated sand in subterranean petroleum containing formations to form a permanent, permeable barrier which allows the passage of fluids through the barrier while restraining the movement of sand, employing the highly effective furfuryl alcohol, in formations whose temperature is below 200° F.

SUMMARY OF THE INVENTION

We have discovered that a strong and durable, permeable mass may be formed in the portion of an unconsolidated sand and petroleum-containing formation, immediately adjacent to a well penetrating the formation, which mass is sufficiently permeable to permit passage of petroleum or other formation fluids therethrough, and yet the flow channels in the permeable mass can be made sufficiently small to restrict the flow of unconsolidated sand or other mineral particulate matter from the formation into the well. The material used to form the permeable mass according to the process that constitutes our invention, is a fluid comprising a monomer or oligomer of furfuryl alcohol, an anhydride of a strong acid and a solubilizing agent in which both oil and water dissolve, such a methyl isobutyl ketone. A preflush is used to eliminate all but trace amounts of water from the zone being treated before the polymer is injected. The treating fluid is introduced into treating zone, i.e., the portion of the formation where consolidation is desired. The acid anhydride reacts with the trace amounts of water in the formation, forming an acid which begins to catalyze the furfuryl alcohol to undergo condensation reaction. Condensation polymerization of furfuryl alcohol produces additional amounts of water, which reacts with additional amounts of anhydride to produce more acid, causing additional polymerization. The volume of fluid injected into the formation is sufficient to saturate the pore space of the formation for a distance up to 4 and preferably 2 feet away from the wellbore, and allowed to remain undisturbed in the formation for at least 15 and preferably at least 24 hours. The resultant polymer-coated sand forms a fluid permeable barrier around the wellbore which is effective for formation conditions up to about 300.F and is quite stable with time.

DETAILED DESCRIPTION OF THE INVENTION AND DESCRIPTION OF THE PREFERRED EMBODIMENT

The process of our invention involves injecting a fluid into unconsolidated sand in a petroleum-containing formation immediately adjacent to a wellbore to produce a permeable, consolidated mass which restrains sand flow but allows petroleum to flow therethrough.

The process to be described below requires that only trace amounts of water remain in the portion of the formation at the time of injecting the treating fluid. For our purpose, the water content should be in the range of 0 to 5 and preferably from 0 to 1 percent by volume based on the volume of the pore space into which the treating fluid is injected. This may not require any pretreatment. If the water content exceeds 5%, however, it is necessary to treat the zone where consolidation is desired to reduce the water content to the desired level given above prior to introducing the treating fluid. This can be accomplished by injecting air or other non-aqueous fluid to displace the water away from the zone to be treated. Air or other non-aqueous gas injection for 1 to 8 hours will reduce the water content to an acceptable level. Injecting a non-aqueous liquid phase preflush is another method for reducing the water content to an acceptable level. An alcohol such as methanol or an ester such as ethyl acetate or butyl acetate are effective preflushes. The volume of preflush should be from ½ to 1 times the volume of the well in the interval being treated.

The treating fluid comprises from 40 to 80 percent and preferably from 40 to 60 percent of a polymerizable compound which will undergo acid-catalyzed condensation polymerization in order to form a solid matrix in the treated interval to bind the sand grains together and still provide adequate permeability so oil will flow through the consolidated mass into the well. The preferred polymerizable compound is an oligomer of furfuryl alcohol such as Q.O. 1300 ® available from Q. O. Chemical Co.

The treating fluid also contains a small amount of an anhydride of a strong acid. Anhydrides which are so reactive as to be unstable in moist air, such as $SO_2$ should be avoided. One preferred anhydride for our purpose is phosphorous tribromide, $PBr_3$ which reacts as follows:

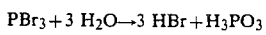

$$PBr_3 + 3 H_2O \rightarrow 3 HBr + H_3PO_3$$

Other preferred acid anhydrides for our purpose are other phosphorous halides, phosphorous pentoxide, $(P_4O_{10})$ and phosphorous trichloride, $(PCl_3)$.

The concentration of anhydride should be from 0.1 to 0.5 and preferably from 01 to 0.3 percent by volume based on the total volume of the treating fluid used.

The treating fluid also contains a suitable diluent for the furfuryl alcohol oligomer which is also water soluble. One preferred diluent is methyl isobutyl ketone. Other suitable diluents are methanol and ethanol. The concentration of diluent in our treating fluid should be from 20 to 60 and preferably from 40 to 60 percent by volume based on the total volume of treating fluid.

The treating fluid comprising the polymerizable component such as furfuryl alcohol oligomer, the diluent such as methyl isobutyl ketone and the acid anhydride such as phosphorous tribromide are relatively stable and unreactive so long as the fluid remains water free. No polymerization of the furfuryl alcohol begins until water and anhydride combine to form acid. Once the fluid is introduced into the formation, contact between the anhydride and trace water remaining in the treatment zone even after a preflush, causes formation of a small amount of acid. The acid catalyzes furfuryl alcohol condensation, which produces a small amount of additional water. The additional water reacts with more anhydride to produce more acid. The result is a well controlled chain chemical reaction. Once the anhydride is depleted, the reaction stops and the consolidation is complete.

In most formations, the sand naturally present in the formation may be utilized to form the barrier by contacting it with the treating fluid according to the process described herein. This is the preferred embodiment whenever the sand quality is sufficient to permit its use in forming the consolidated sand mass in the treatment zone of the formation adjacent to the wellbore. In some applications, the subterranean formation does not contain sand which is suitable for use in forming the permeable barrier according to my process, either because of the relatively low sand content of the formation, or its particle size or other characteristics make is unsuitable for use in the sand consolidating process. In this instance, it may be necessary to enlarge the diameter of the wellbore and introduce good quality sand or other granular material to form an unconsolidated sand mass in the formation, which can then be treated with the treating fluid. In on embodiment of the process of our invention, a minor portion of the formation adjacent to the well is removed either by flushing with water or mechanically underreaming the well in order to form a uniform cavity larger than the original wellbore. After a suitable amount of formation material has been removed, a tubing string or other injection means is placed in the well and sand is slurried with a suitable fluid and pumped into the wellbore. The sand particles are filtered from the slurry with the aqueous component of the slurry passing into the formation, thereby forming a pack or filter cake of unconsolidated sand which can be treated in accordance with this process to form the permeable barrier around the well.

The volume of treating fluid for use in the process of our invention should be sufficient to completely saturate the pore space in the formation adjacent to the wellbore for a distance up to 4 feet and preferably up to 2 feet into the formation. In effect, a treated zone is created equivalent to a hollow cylinder whose outside diameter is up to 2 to 4 feet and inside diameter is equal to the diameter of the well drilled into the formation. The height of the cylinder is determined by the thickness of the petroleum-containing formation in which the barrier is to be formed.

EXPERIMENTAL SECTION

The following experimental work is offered to support the operability and demonstrate the preferred embodiments for use in the process of our invention. The furfuryl oligomer used in the experiments was Q.O. 1300 ® manufactured by Q.O. Chemical Company.

Two drops of PBr$_3$ were added to 10 ml of methyl isobutyl ketone. To this we added 10 ml of Q.O. 1300 ®, an oligomer of furfuryl alcohol. Kept at room temperature, the mixture was quite liquid more than 24 hours later. At 140° F., polymerization occurred in 8 hours. In a sand containing trace amounts of water at 140° F., a sturdy, permeable sand consolidation was produced.

FIELD EXAMPLES

For the purpose of ensuring complete disclosure and compliance with requirements of disclosing the best mode, the following field example is offered.

A well is drilled into a subterranean petroleum containing formation, and completed at an interval from 4520 to 4560 feet, the interval being 40 feet in thickness measured vertically. The mineral matrix of the formation is essentially all unconsolidated sand, so the sand naturally present in the formation may be utilized in the process of our invention. The sand grains do contain residual viscous or solid hydrocarbon materials on them, and the water content of the sand interval is 15 percent, which is excessive for our purpose. Therefore, for the purpose of ensuring good contact between the polymerized furfuryl alcohol and the sand grains, a preflush is used. Since it is desired to saturate the pore space of the formation, whose porosity is approximately 30%, for a distance about 3 feet into the formation, the following volume of butyl acetate will be required for the preflush.

$$0.30 \times 40 \times 3.1416 \times (3)^2 = 339.29 \text{ cu.ft. or } 2{,}538 \text{ gal. of butyl acetate}$$

After the above described volume of butyl acetate has been injected into the formation, the treating fluid for our process is formulated. Approximately 2,500 gallons of fluid is utilized, and the following amounts of the indicated material are mixed to form the desired emulsion.

1250.00 gal. Furfuryl Alcohol
7.50 gal. Phosphorous Tribromide
1242.50 gal Methyl Isobutyl Ketone The above materials are blended well to form a homogenous fluid and injected into the formation. The well is then shut in and the injected fluid allowed to remain in the formation for approximately 24 hours. The well is then put on production and it is determined that good oil production rates are obtained with essentially no sand being present in the produced fluid.

While our invention has been described in terms of a number of illustrative embodiments, it is clearly not so limited since many variations thereof will be apparent to persons skilled in the related art without departing from the true spirit and scope of our invention. It is our intention that our invention be limited only by those limitations and restrictions imposed in claims appended immediately hereinafter below.

We claim

1. A method of treating a subterranean, unconsolidated sand and petroleum-containing formation whose temperature is less than 200° F. penetrated by at least one well, which is in fluid communication with at least a portion of the unconsolidated sand-containing subterranean formation, in order to form a permeable barrier in the treatment zone around the well which restrains the movement of sand particles into the well while permitting the passage of formation fluids including petroleum therethrough, comprising:
   a. introducing a non aqueous gas into the treatment zone of the formation to reduce the water content of the portion of the formation where the permeable barrier is to be formed to less than 5 percent by volume based on the volume of pore space to be treated;
   b. introducing an effective volume of treating fluid into the treatment zone, comprising a compound which is capable of being acid catalyzed to undergo condensation polymerization at formation temperatures, an anhydride of a strong acid, and a diluent for the polymerizable compound and the anhydride; and
   c. allowing the treating fluid to remain in the treatment zone for a period of time sufficient to ensure substantially complete polymerization.

2. A method as recited in claim 1 wherein the polymerizable compound is an oligomer of furfuryl alcohol.

3. A method as recited in claim 1 wherein the anhydride is a phosphorous halide.

4. A method as recited in claim 1 wherein the phosphorous halide is phosphorous tribromide.

5. A method as recited in claim 3 wherein the acid anhydride is phosphorous trichloride.

6. A method as recited in claim 1 wherein the acid anhydride is phosphorous pentoxide.

7. A method as recited in claim 1 wherein the diluent is selected from the group consisting of methyl isobutyl ketone, methanol and ethanol.

8. A method as recited in claim 7 wherein the diluent is methyl isobutyl ketone.

9. A method as recited in claim 1 wherein the concentration of polymerizable compound in the treating fluid is from 40 to 60 percent by volume.

10. A method as recited in claim 1 wherein the concentration of acid anhydride in the treating is from 0.1 to 0.5 percent by volume.

11. A method as recited in claim 1 wherein the concentration of acid anhydride is from 0.1 to 0.3 by volume.

12. A method as recited in claim 1 wherein the concentration of diluent is from 20 to 60 percent by volume.

13. A method as recited in claim 1 wherein the concentration of diluent is from 40 to 60 percent by volume.

14. A method as recited in claim 1 wherein the non aqueous gas is air.

15. A method as recited in claim 1 wherein the volume of treating fluid injected into the formation is sufficient to saturate the pore space of the formation adjacent the well for a a distance of up to 4 feet from the wellbore into the formation.

16. A method as recited in claim 1 wherein the volume of treating fluid injected into the formation is sufficient to saturate the pore space of the formation adjacent to the well for a a distance of up to 2 feet from the wellbore into the formation.

17. A method as recited in claim 1 wherein the volume of treating fluid injected into the formation for at least 24 hours prior to resuming producing fluids from the formation.

* * * * *

UNITED STATES PATENT AND TRADEMARK OFFICE
CERTIFICATE OF CORRECTION

PATENT NO. : 5,040,604

DATED : August 20, 1991

INVENTOR(S) : Robert H. Friedman and Billy W. Surles

It is certified that error appears in the above-identified patent and that said Letters Patent is hereby corrected as shown below:

Claim 17, Col. 6, line 65, delete "volume of".

Claim 17, Col. 6, line 65, delete "injected into" and substitute --is left in--

Claim 17, Col. 6, lines 64 thru 67 inclusive should read as follows:

"17. A method as recited in Claim 1 wherein the treating fluid is left in the formation for at least 24 hours prior to resuming producing fluids from the formation."

Signed and Sealed this

Twentieth Day of April, 1993

Attest:

MICHAEL K. KIRK

*Attesting Officer*    Acting Commissioner of Patents and Trademarks